Feb. 8, 1927.

C. W. CASSELS 1,617,044

COUPLING

Filed May 17, 1924

Inventor
Charles Wellman Cassels
by Thurston Bauer his
Atty.

Patented Feb. 8, 1927.

1,617,044

UNITED STATES PATENT OFFICE.

CHARLES WELLMAN CASSELS, OF HAMILTON, ONTARIO, CANADA, ASSIGNOR TO THE N. SLATER COMPANY, LIMITED, OF HAMILTON, ONTARIO, CANADA.

COUPLING.

Application filed May 17, 1924. Serial No. 714,145.

My invention relates to improvements in couplings and more particularly to couplings adapted to carry an axial pull load and the object of the invention is to devise a novel manner of reinforcing such couplings so as to provide additional strength and wear resisting qualities at the points where these are most needed, thus obtaining greater strength and durability in the coupling than hitherto with a minimum weight of metal; a further object is to enable the coupling to be made of more completely malleable material.

Other objects will appear in the course of the following specification.

My invention consists of a coupling element having an internal concave seat therein and connected to one side of an axial pull load, and a novel type of insert mounted to engage said seat and connected to the other side of the load, all as hereinafter more particularly described and illustrated in the accompanying drawings in which.

In the drawings like characters of reference indicate corresponding parts in the various views.

Figure 1:
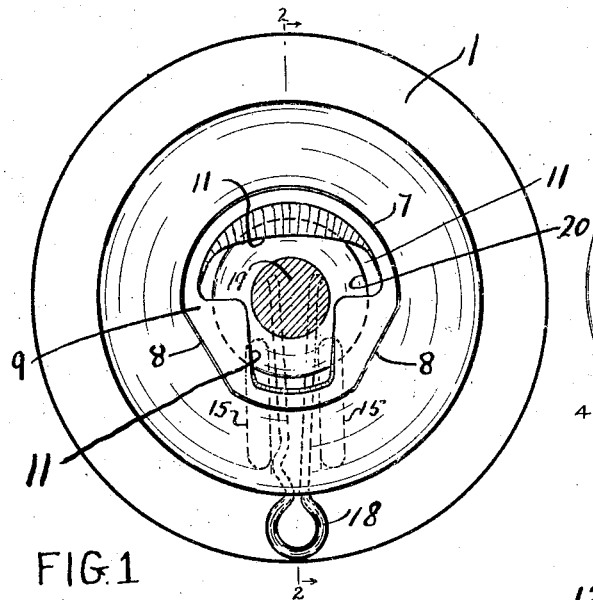
Fig. 1 is a plan view of an embodiment of my invention.
Figure 3:
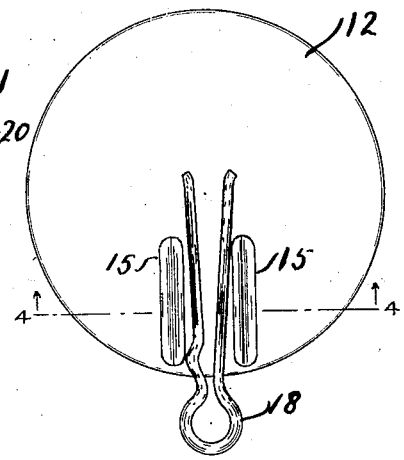
Fig. 3 is a top plan view of a diaphragm used in the form of my invention illustrated, and shows the relative position occupied by a cotter pin.
Figure 4:
Fig. 4 is a section on the line 4—4 of Fig. 3.
Figure 2:
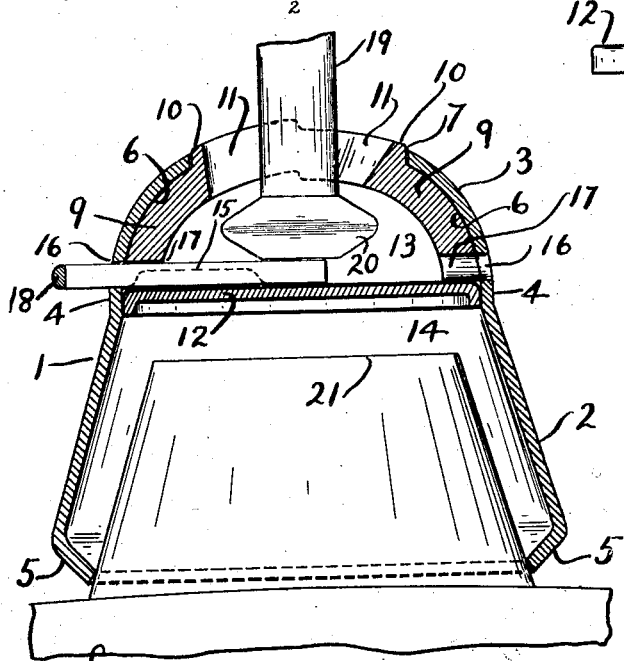
Fig. 2 is a section taken on the line 2—2 of Fig. 1.

For the purposes of description I have illustrated my invention as applied to a suspension type insulator but it is to be understood that, it is applicable to a great many other forms of couplings and therefore is not to be taken as limited to the particular form shown.

In the form of my invention illustrated 1 indicates an insulator cap, preferably formed from a sheet metal stamping and comprises the open mouthed lower portion 2 and the dome-shaped upper end portion 3 connected by the cylindrical portion 4.

The portion 2 is turned inwardly at 5 about the mouth of the cap.

The inner surface of the dome-shaped end 3 forms a dome-shaped internal concave seat 6 within the cap 1.

The cap is provided with an orifice 7 through the end of the dome 3, which orifice is circular with the exception of the two flats 8, the purpose of which will presently appear.

9 is a dome-shaped insert, the outer surface of which constitutes an external convex surface which engages the internal concave seat 6 in the cap.

The insert 9 is formed with a raised portion 10 which projects through and conforms in shape to the orifice 7. The engagement of this raised portion 10 within the orifice 7, it will be apparent, provides a means of definitely positioning the insert within the cap.

The insert 9 is provided centrally with a peculiar T-shaped orifice 11, the purpose of which will presently be explained.

A retainer in the form of a metal plate 12 is a tight press fit within the cylindrical portion 4 of the cap and bears against the bottom of the insert 9, thus securely holding it in position and also separating the cap into upper and lower compartments 13 and 14 respectively.

The plate 12 may be stamped to cupped form and is formed with two spaced apart protuberances 15 on its upper side, the purpose of which will appear hereinafter.

The cap 1 and insert 9 are provided with diametrically opposite orifices 16 and 17 respectively, which register when the insert is in position within the cap.

These orifices permit entry of the cotter-pin 18 which pin rests upon the top face of the diaphragm 12 and lies between the proturberances 15, which provide a means for positioning said pin radially across the diaphragm and preventing lateral movement thereof.

19 indicates an insulator suspension pin of the common type formed with the enlarged head 20.

An insulator 21 is secured within the lower portion 2 of the cap by cementing or in any other suitable manner.

The construction and operation of my invention is as follows:

The insert 9 is inserted within the cap 1, being accurately positioned therein by the engagement of the flats on the raised portion 10 with the flats 8 of the orifice 7 in the cap.

The diaphragm 12 is tightly pressed into place within the cylindrical portion 4 of the cap and firmly secures the insert in place.

The enlarged head 20 of the pin 19 is inserted obliquely through the top branch of the T-shaped orifice 11, sufficient depth of clearance being provided within the insert above the diagram to permit entry of the head 20.

After the head is fully inserted within the insert, the pin is moved into its upright position in which position it is retained within the insert, due to the peculiar shape of the orifice 11.

In order to prevent disengagement of the head 20, the cotter-pin 18 is then inserted through the orifices 16 and 17 and lies centrally below the head 20 filling up sufficient of the clearance thereunder so that the pin 19 cannot move into a sufficiently oblique position to permit passage of the head 20 outwardly through the top branch of the T-shaped orifice 11.

The protuberances 15 prevent lateral movement of the cotter-pin and thus maintain it positioned centrally below the head 20 of the pin 19.

It will be apparent that the shape of the orifice 11 is such that the passage of the head 20 of the pin 19 obliquely therethrough is permitted, when the cotter-pin 18 is not in position, but passage axially therethrough is not possible.

Also the cotter-pin 18 and diaphragm 12 constitute means for retaining the pin in engagement within the insert.

No claim of novelty is made to the use of the peculiar T-shaped orifice 11, or the enlarged head 20, or the cotter-pin 18 as these have been used heretofore, but it has been necessary, in order to clearly explain my invention, to illustrate and describe some specific manner of connecting the pin 19, representing one side of an axial pull load, to the insert 9 and this particular construction has, therefore, been chosen for purposes of illustration only, it being understood that my invention may equally well apply to various other forms.

A feature of my invention is that, by the use of the insert 9 great extra strength and wearing qualities are provided at exactly the points where most needed and, by providing this strength in the form of a separable insert, the cap 1 itself may be made of a much thinner material than is otherwise possible.

In this way the cap 1 may be formed as a comparatively thin metal stamping, which will have sufficient strength to carry the load and the additional strength added at the end thereof by the separate insert 9.

The manner in which the raised portion 10 of the insert projects through the orifice 7 in the cap is important since it provides a bearing surface for the pin 19 which thus does not contact with the cap 1 at all.

Many modifications may be made in my invention without departing from the spirit thereof or the scope of the claim and therefore the exact form shown is to be taken as illustrative only and not in a limiting sense.

For instance, in certain forms of couplings the diaphragm 12 would not be necessary and other means of securing the insert 9 in position could be used.

From the foregoing it will appear that I have devised valuable improvements in couplings which will have a very wide application.

What I claim as my invention is:

In a coupling for carrying an axial pull load, in combination, a coupling element comprising a casing open at one end and of dome-shape at the opposite end, the dome-shaped end having an orifice therethrough, a separate dome-shaped insert seating within the dome-shaped end of the casing and formed with a raised portion projecting through the aforesaid orifice in the casing, said insert having an orifice therethrough registering with said raised portion, a pin extending through said orifice and formed with an enlarged head, a diaphragm mounted within the casing and engaging against the base of the dome-shaped insert, said orifice in the insert so shaped as to permit the passage of said enlarged head through said orifice when the pin is in an oblique position with respect to the orifice and to prevent such passage when the pin is disposed axially with respect to said orifice, and removable means above said diaphragm adapted to engage said enlarged head to prevent the pin from assuming a sufficiently oblique position to permit its passage through the orifice.

CHARLES WELLMAN CASSELS.